United States Patent
Filip

(10) Patent No.: US 9,471,834 B1
(45) Date of Patent: Oct. 18, 2016

(54) SYSTEM AND METHOD FOR UPDATING MAP VIEWS

(71) Applicant: Google Inc., Mountain View, CA (US)

(72) Inventor: Daniel Joseph Filip, San Jose, CA (US)

(73) Assignee: Google Inc., Mountain View, CA (US)

( * ) Notice: Subject to any disclaimer, the term of this patent is extended or adjusted under 35 U.S.C. 154(b) by 229 days.

(21) Appl. No.: 14/134,464

(22) Filed: Dec. 19, 2013

Related U.S. Application Data

(60) Provisional application No. 61/907,760, filed on Nov. 22, 2013.

(51) Int. Cl.
*G06K 9/00* (2006.01)

(52) U.S. Cl.
CPC .................. *G06K 9/00476* (2013.01)

(58) Field of Classification Search
CPC ... G06T 19/006; G06T 7/0044; G06T 17/05; G06T 2219/024; G06F 17/30241
See application file for complete search history.

(56) References Cited

U.S. PATENT DOCUMENTS

| | | | |
|---|---|---|---|
| 2009/0279794 A1* | 11/2009 | Brucher et al. | 382/225 |
| 2010/0046842 A1* | 2/2010 | Conwell | 382/218 |
| 2012/0166074 A1* | 6/2012 | Weng et al. | 701/409 |

OTHER PUBLICATIONS

Kennedy et al., How Flickr Helps us Make Sense of the World: Context and Content in Community-Contributed Media Collections, 2007, MM'07, Sep. 23-28, 2007, Augsburg, Bavaria, Germany, pp. 1-10.*
Heipke at al., Crowdsourcing geospatial data, 2010, ISPRS Journal of Photogrammetry and Remote Sensing 65 (2010), pp. 550-557.*
Anguelov et al., Google Street View: Capturing the World at Street Leve, 2010, Published by the IEEE Computer Society, 9932-36.*
Arth et al., Geospatial Management and Utilization of Large-Scale Urban Visual Reconstructions, 2013, IEEE—2013 Fourth International Conference on Computing for Geospatial Research and Application, pp. 64-69.*
Stvillia, et al., "Towards Assessing Relative Value of User-Generated Tags to Knowledge Organization Systems", Downloaded Oct. 23, 2013.

* cited by examiner

*Primary Examiner* — Vu Le
*Assistant Examiner* — Guillermo Rivera-Martinez
(74) *Attorney, Agent, or Firm* — Lerner, David, Littenberg, Krumholz & Mentlik, LLP

(57) ABSTRACT

A system and method are provided for updating imagery associated with map data. A request for map data is received, and a first image of a geographical location corresponding to the map data is provided in response to the request. Information relating to a status of an object in the first image is received, and it is determined whether the first image is to be updated based at least on the received information. If it is determined that the first image is to be updated, an updated image is received and used to update the first image.

19 Claims, 7 Drawing Sheets

SYSTEM AND METHOD FOR UPDATING MAP VIEWS

CROSS-REFERENCE TO RELATED APPLICATIONS

The present application claims the benefit of the filing date of U.S. Provisional Patent Application No. 61/907,760 filed Nov. 22, 2013, the disclosure of which is hereby incorporated herein by reference.

BACKGROUND

Upon request, map data for a given location and associated imagery may be provided to a user. However, sometimes the imagery include inaccuracies. For example, objects in the images may have changed between a time the image was captured and a time the image is provided to the user.

SUMMARY

Users may provide information regarding objects in images of a given location. For example, users may provide status information indicating that the image is out of date or that an object in the image has changed. This information may be used, for example, to obtain updated imagery for the given location.

One aspect of the disclosure provides a computer-implemented method for updating images of a geographical location. According to this method, one or more computing devices receive a request for map data, and provide a first image of a geographical location corresponding to the map data. The one or more computing devices further receive information relating to a status of an object in the first image, and determine whether the first image is to be updated based at least on the received information. The one or more computing devices receive an updated image if it is determined that the first image is to be updated, and update the first image based at least in part on the updated image.

Another aspect of the disclosure provides a system comprising a memory storing map data including at least a first image of a geographical location corresponding to the map data, and one or more computing devices in communication with the memory. The one or more computing devices receive a request for the map data, and provide the first image in response to the request. The one or more computing devices further receive information relating to a status of an object in the first image, and determine whether the first image is to be updated based at least on the received information. The one or more computing devices receive an updated image if it is determined that the first image is to be updated, and update the first image based at least in part on the updated image.

Yet another aspect of the disclosure provides a non-transitory computer readable medium storing instructions executable by a processor. When executed, the instructions perform a method comprising receiving a request for map data, providing a first image of a geographical location corresponding to the map data, receiving information relating to a status of an object in the first image, determining whether the first image is to be updated based at least on the received information, receiving an updated image if it is determined that the first image is to be updated, and updating the first image based at least in part on the updated image.

DETAILED DESCRIPTION

Overview

Images of a geographical location provided to a user in response to a request for map information may be outdated or otherwise inaccurate. For example, objects in the images may have been modified between a time when the image was taken and a time it was provided to the user. According to aspects of the disclosure, users may provide information indicating a status of the images or of particular objects in the images. For example, the user may indicate that a building has been erected or torn down, that a business shown in the image has changed, or the like.

According to one example, the user may provide such information by annotating the image. For example, the user may draw, insert symbols, insert text, or add any other types of notation. According to other examples, the user may provide such information by submitting an updated image of the geographical location. In some instances, the status information provided by the user may be provided to other users that request map information corresponding to the geographical location.

The information provided by the users regarding the status of the objects or images may be maintained by one or more computing devices. Further, the computing devices may determine, using the information, whether the image should be updated. For example, if a given area includes a threshold number of objects indicated as being inaccurate or outdated, it may be determined that the image of that given area should be updated.

Updated images may be received at the computing devices from any of a number of sources. For example, a vehicle with a mounted camera can drive through the given geographical area and record new images. As another example, individuals may be notified of the determination that the image should be updated. For example, an owner of a business that is not shown in the image, because a prior existing business at the same location is shown instead, may be notified and requested to submit an updated image. As another example, one or more of a group of participants that have opted in to provide imagery may be notified and requested to provide an updated image. The updated image can then replace the existing image.

According to other examples, status information may be provided by the user through submission of a second image. For example, the submitted second image may be matched to an existing image by location information associated with the images. The images may be compared to determine, for example based on date information or by comparing objects within the image, whether the submitted image should replace the existing image.

Example System

Figure 1:
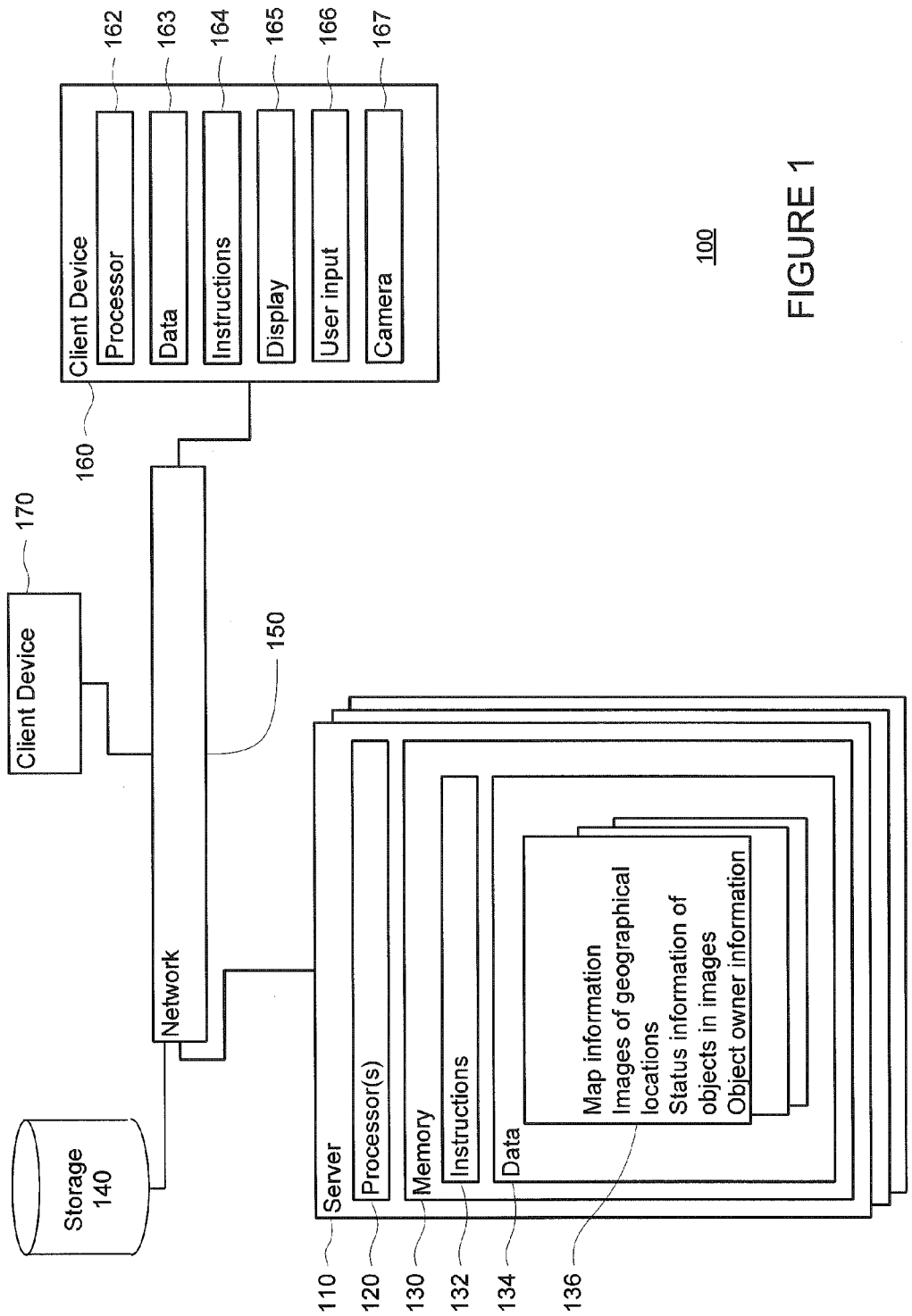
FIG. 1 is a functional diagram of a system in accordance with aspects of the disclosure.
Figure 2:
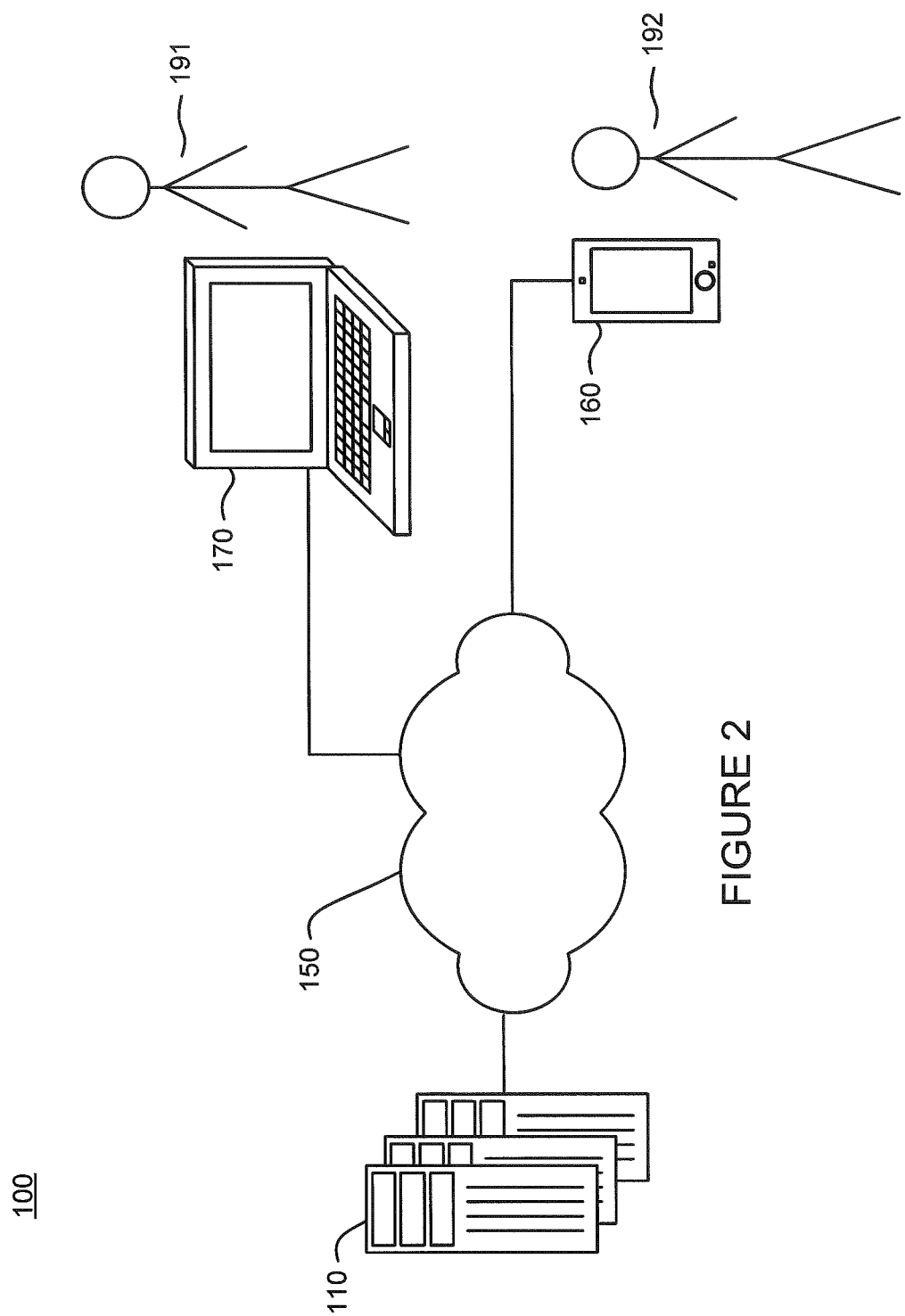
FIG. 2 is a pictorial diagram of the system of FIG. 1.

FIGS. 1 and 2 include an example system 100 in which the features described above may be implemented. It should not be considered as limiting the scope of the disclosure or usefulness of the features described herein. In this example, system 100 can include one or more computing devices 110, which may be connected to further computing devices 160 and 170 over a network 150.

Computing devices 110 can contain one or more processors 120, memory 130 and other components typically present in general purpose computing devices. The memory 130 can store information accessible by the one or more processors 120, including instructions 132 that can be executed by the one or more processors 120.

Memory 130 can also include data 134 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 132 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 134 can be retrieved, stored or modified by the one or more processors 120 in accordance with the instructions 132. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 120 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110 can be at different nodes of the network 150 and capable of directly and indirectly communicating with other nodes of network 150. Although only a few computing devices are depicted in FIGS. 1-2, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with a storage system as well as computing devices 160, 170 via the network 150. For example, one or more of server computing devices 110 may use network 150 to transmit and present information to a user, such as user 191, 192, on a display, such as displays 165 of computing devices 160, 170. In this regard, computing devices 160, 170 may be considered client computing devices and may perform all or some of the features described herein.

Each of the client computing devices 160, 170 may be configured similarly to the server computing devices 110, with one or more processors 162 and memory, including data 163 and instructions 164 as described above. Each client computing device 160, 170 may be a personal computing device intended for use by a user 191, 192 and have all of the components normally used in connection with a personal computing device such as a central processing unit (CPU), memory (e.g., RAM and internal hard drives) storing data and instructions, a display 165 (e.g., a monitor having a screen, a touch-screen, a projector, a television, or other device that is operable to display information), and user input device 166 (e.g., a mouse, keyboard, touch-screen or microphone). The client computing device may also include a camera 167 for recording video streams, speakers, a network interface device, and all of the components used for connecting these elements to one another.

Although the client computing devices 160, 170 may each comprise a full-sized personal computing device, they may alternatively comprise mobile computing devices capable of wirelessly exchanging data with a server over a network such as the Internet. By way of example only, client computing device 160 may be a mobile phone or a device such as a wireless-enabled PDA, a tablet PC, or a netbook that is capable of obtaining information via the Internet. In another example, client computing device 170 may be a head-mounted computing system. As an example the user may input information using a small keyboard, a keypad, microphone, using visual signals with a camera, or a touch screen.

As with memory 114, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. Storage system 140 may be connected to the computing devices via the network 150 as shown in FIG. 1 and/or may be directly connected to any of the computing devices 110, 160, 170.

Storage system 140 may store images and associated information such as image identifiers, orientation, location of the camera that captured the image, intrinsic camera settings (such as focal length, zoom, etc.), depth information, as well as references to other, target images. Moreover, the storage system 140 may store annotations associated with particular images. For example, some images may have an associated image layer that includes comments, directions, or other markings made by one or more users. According to another example, the storage system 140 may store owner information relating to owners of objects in the images. For example, the storage system 140 may store a business or individual name, email address, phone number, or any other information provided by the owner, in association with an address of a given business in the image. In some examples, such information may be used to notify the owner that the image is out of date.

Example Methods

Using the system described above, users may be provided with tools to provide feedback regarding geographical imagery associated with map information. The feedback may relate to an accuracy of the imagery, where inaccuracies may be a result of changes occurring over time in the geographical location, mismappings of the imagery to a street address, or otherwise.

Figure 3:
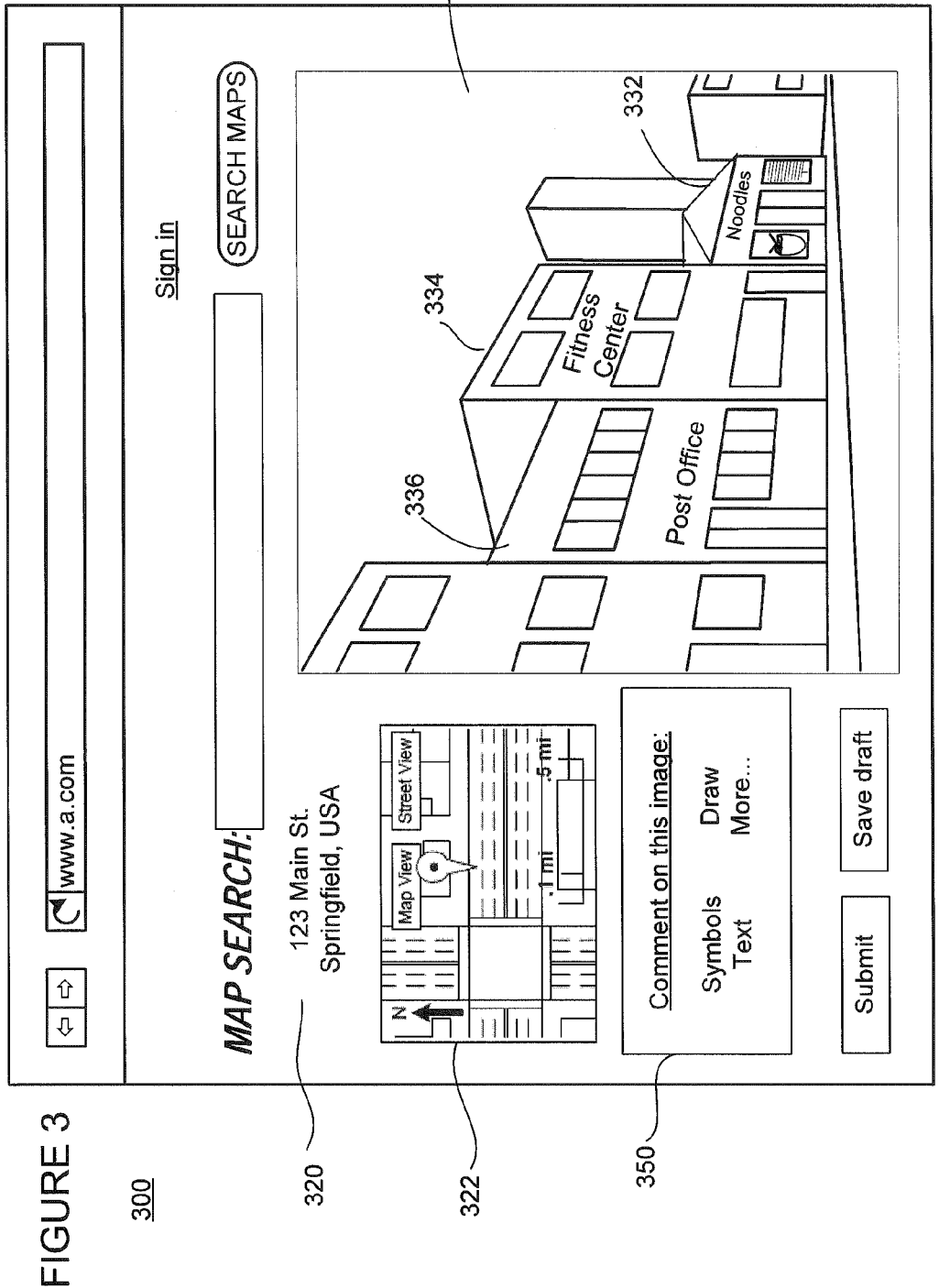
FIG. 3 is an example screen shot in accordance with aspects of the disclosure.

FIG. 3 illustrates an example screenshot providing map information for a given geographical location. The map information includes an image 310, a roadgraph 322, and an address 320 all associated with the given geographical location. The image 310 in this example is taken from the perspective of someone standing in front of the location. For example, from this perspective is shown a post office 336, a fitness center 334, and a noodle restaurant 332. According to some examples, the image 310 may be a panoramic image or part of a panorama. For example, a user may manipulate a viewing field to view different portions of the panorama.

An annotation tool bar 350 is also provided. The annotation tool bar 350 provides tools for a user to make annotations on the image 310. Any type of tool for making any of a variety of annotations may be included in the tool bar 350. Examples of such tools include arrows, circles, place markers, labels, text bubbles, and the like. The tool bar 350 may be provided each time the image is shown, or in response to some input from a user. For example, the user may click an object in the image 310 or click an option to provide feedback, in response to which the annotation tool bar 350 may appear. Alternatively or additionally to annotations, feedback may be provided in any of a number of other ways, such as through image tagging, text submissions, etc.

Figure 4:
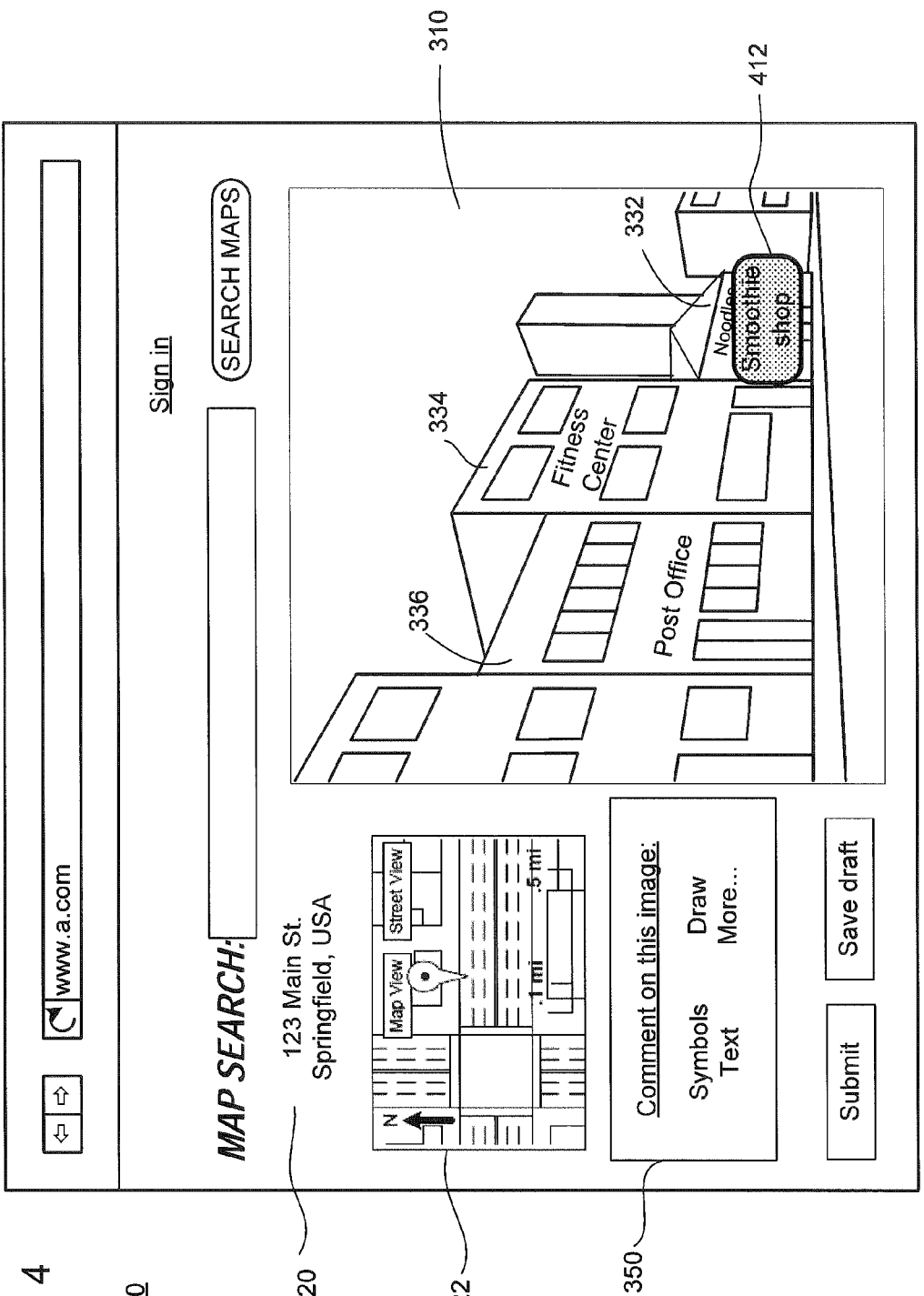
FIG. 4 is another example screen shot in accordance with aspects of the disclosure.

FIG. 4 illustrates an example screenshot illustrating feedback provided for the image 310. In this example, the feedback is provided in the form of a label 412. For example, the original image 310 depicts a post office, a fitness center, and a noodle restaurant. The label 412 indicates that the restaurant is no longer a noodle restaurant, but is now a smoothie shop.

While the feedback is illustrated as annotations in FIG. 4, the feedback may be provided in any of a number of ways, including text descriptions, images, or the like. According to another example, the user may tag an object in the image. The tag may indicate that the object has changed, that a portion of the image is incorrect, that a business has closed, or any other information. For example, when the user clicks an object in the image, a menu or text box may appear allowing the user to provide feedback associated with the object.

The feedback provided may be maintained by one or more computing devices or storage systems. For example, the information may be later used to determine whether the image 310 should be updated, to send a notification regarding a status of an object in the image, or for any other use. According to some examples, the feedback may be provided to subsequent users that request map information for the same given geographical location.

Figure 5:
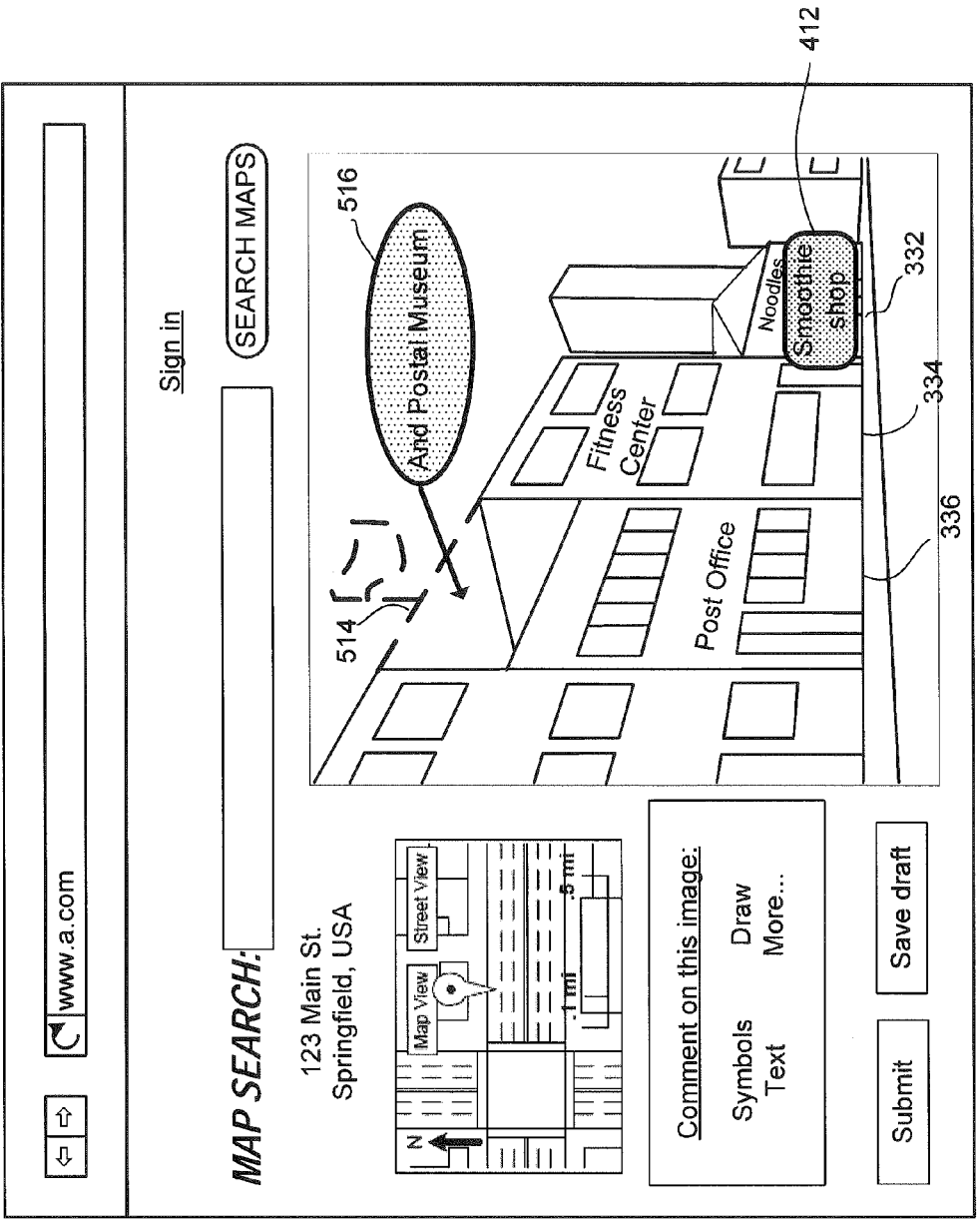
FIG. 5 is another example screen shot in accordance with aspects of the disclosure.

FIG. 5 illustrates another example screenshot providing additional feedback. As shown, the additional feedback includes a drawing 514 and text bubble 516. The additional feedback indicates an additional business which is not shown in the image 310. For example, the building 336 may be indicated to be remodeled and to include an additional business (e.g., "postal museum").

According to some aspects of the disclosure, it is determined based on the feedback received whether updated images should be obtained. For example, if a particular number of objects within a given geographical area are indicated by users as being inaccurate or out of date, it may be determined that a new image should be obtained. In further examples, additional factors may be considered when determining whether to obtain updated images. For example, a date when the original image was taken or a quality of the image (e.g., resolution, blurriness, lighting, etc.) may be considered.

According to one example, new images may be obtained using a camera moved throughout a given geographical area. For example, a video camera may be mounted on a vehicle that drives through the streets of the geographical area. In this regard, new panoramic images may be obtained.

According to another example, new images may be obtained by notifying one or more individuals that an object was indicated to be inaccurate. For example, an owner of a current business may be notified that a previous business still appears in imagery instead of the current business. In this regard, the current business owner may submit an updated image. As another example, a notification may be sent to a group of participants that have signed up to submit imagery. In this regard, any participants in the geographical area of the inaccurate image my take and submit new images. In some examples, these participants may provide information relating to their current location, for example, via GPS, text message, or any other way of identifying location. Accordingly, the notification regarding the inaccurate image may be limited to participants within a predefined range of the geographical location in the image.

According to another example, users may submit imagery of geographical locations without a request for updated imagery. For example, users travelling to various destinations may upload panoramas or other images to a remote server or other computing device. The submitted imagery may include metadata or supplemental information provided by the user indicating a date, time, location, or other information regarding when and where the submitted image was taken. This metadata or supplemental information may be used to determine whether a geographical location in the submitted image corresponds to the given geographical location of the outdated image. If it is determined that the location of the submitted image matches the location of an image indicated to be outdated, the outdated image may be updated with the submitted image.

Figure 6:
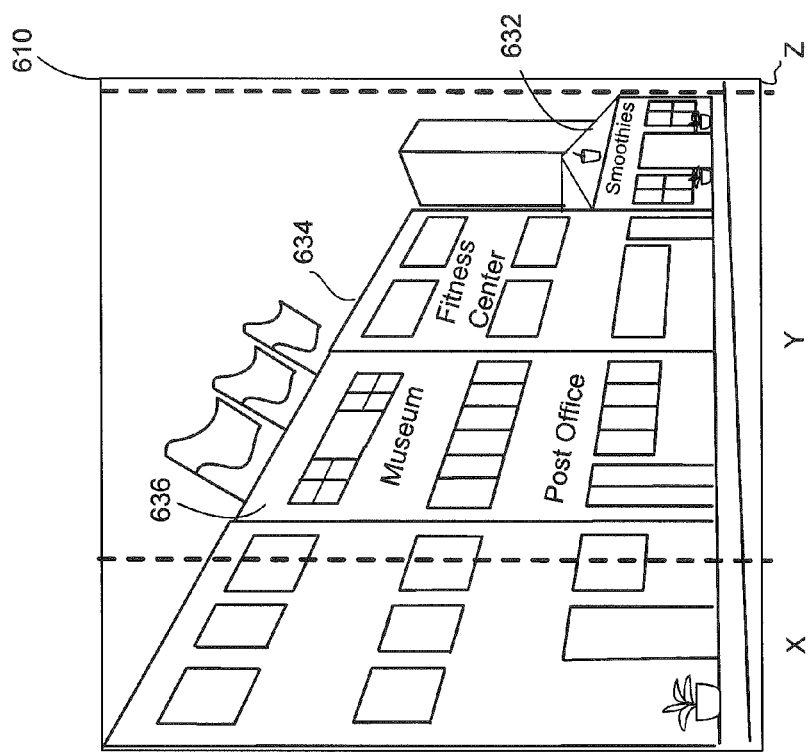
FIG. 6 illustrates and example of updating imagery in accordance with aspects of the disclosure.
Figure 6:
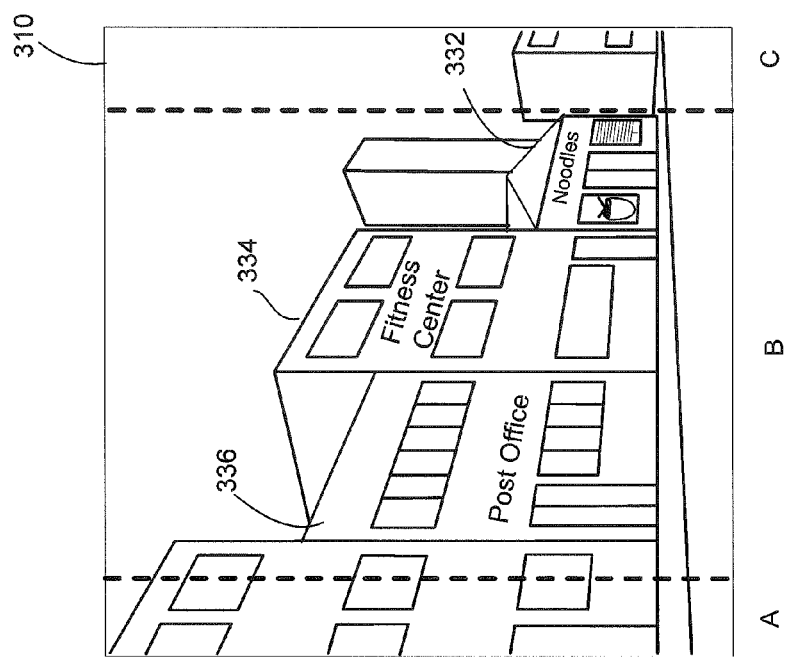

FIG. 6 illustrates an example of updating an inaccurate image with a new image. For example, new image 610 may have been obtained in response to a determination that the image 310 was inaccurate. The new image 610 includes updated objects, including businesses 632, 634, 636. A segment of the new image 610 may be stitched together with portions of the image 310 to update the image 310. For example, segment Y between the dotted lines shown along the new image 610 may be stitched together with portions A and C of the image 310. In this regard, segment B of the image 310, which includes the outdated imagery, is replaced. While this example describes updating a panoramic image by replacing a portion of the panorama, it should be understood that the entire panorama may be replaced instead.

In some instances, a new image may be taken from a different location or with a different pose. In such instances, additional processing may be performed on the new image to match it to the original image. For example, a relative difference in location or pose between the two images may be determined. Using the relative difference, the new image may be transformed to match it to the original image. For example, the new image may be magnified, reduced, shifted, translated, interpolated, enhanced, or otherwise processed. The processed new image may then be used to update the original image.

Figure 7:
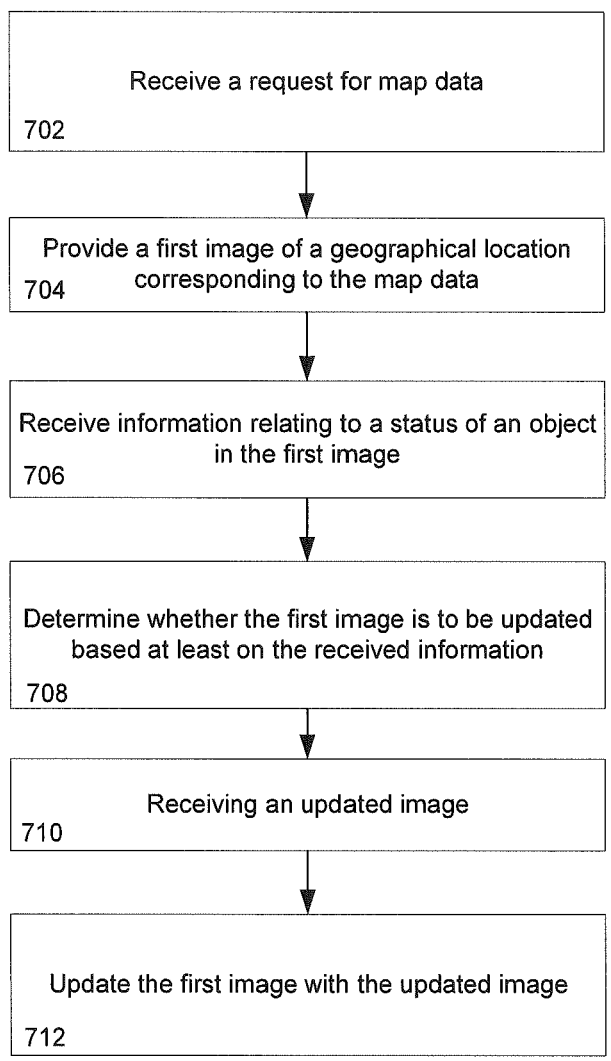
FIG. 7 is a flow diagram of an example method in accordance with aspects of the disclosure.

FIG. 7 provides a flow diagram illustrating an example method 700. The following operations do not have to be performed in the precise order described below. Rather, various steps can be handled in a different order or simultaneously. Steps can also be omitted unless otherwise stated.

In block 702, a request for map information is received. For example, a user may submit a request to a server for map information associated with a street address or point of interest.

In block 704, a first image is provided of a geographical location corresponding to the map data. The first image may be a panoramic image captured from a perspective of someone standing at or near the location. The first image may be provided, for example, through a user interface, such as a web site.

In block 706, information relating to a status of an object in the first image is received. For example, the user may provide information indicating that the object is out of date. Examples of out of date objects include businesses that have changed, buildings that have been torn down, erected, or renovated, monuments that have been erected, or any other changes. According to another example, the status information may identify that an object at the location is otherwise inaccurately represented in the first image. The information relating to the status of objects in the first image may be provided through tagging, text submissions, annotations, images of the location, or any other way of conveying information.

In block 708, it is determined whether the first image is to be updated based at least on the received information. For example, it may be determined that the first image should be updated if it includes a predetermined number of objects indicated to be inaccurate or out of date, if a predetermined number of submissions relating to an object in the image were received, if the status information indicates a particularly significant change, etc. According to some examples, the determination may further be based on information such as the date the first image was taken or a quality of the first image.

In block 710, an updated image is received. The updated image may be received from cameras moved throughout an area including the given location. According to another example, the updated image may be received from individuals or business owners. For example, business owners may be notified that their business is not accurately represented in the images and requested to submit a new image. As another example, one or more participants may be invited to submit updated images of the given location. As yet another example, the updated image may be provided by the user requesting the map information to indicate that the first image is inaccurate.

In block 712, the first image is updated with the updated image. The first image may be wholly or partially replaced with the updated image. For example, portions of the updated image may be stitched together with portions of the first image. Accordingly, the portions of the first image including the objects identified as out of date may be updated with corresponding portions of the updated image.

The above described features may be advantageous in that it enables provision of up to date imagery associated with map information. Thus, for example, users viewing a particular location prior to travelling there will have accurate information to assist them in finding the particular location. Moreover, business owners may be provided with information that will allow them to bolster their business by ensuring that the business is accurately depicted to users.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
receiving, by one or more computing devices, a request for map data;
providing, by the one or more computing devices in response to the request, a first image of a geographical location corresponding to the map data;
receiving, by the one or more computing devices, information from a first user relating to a status of an object in the first image, the information including one or more annotations added to an image layer associated with the first image;
determining, by the one or more computing devices, whether the first image is to be updated based at least on the received information from the first user, wherein the determining includes at least one of:
(i) determining whether a predetermined number of objects in the first image are indicated to be inaccurate or out of date;

(ii) determining whether a predetermined number of submissions relating to an object in the first image were received;
(iii) determining whether the status information indicates that an object in the first image has changed;
(iv) determining a date when the first image was taken; or
(v) determining a quality measure of the first image comprising: resolution, blurriness, or lighting.

2. The method of claim 1, further comprising notifying, using the one or more computing devices, a second user associated with the object of the received status information.

3. The method of claim 2, further comprising requesting the second user associated with the object to provide the updated image.

4. The method of claim 1, wherein it is determined that the first image is to be updated if status information is received for a predetermined number of objects within a given area of the geographical location.

5. The method of claim 1, further comprising transmitting a request to one or more participants to provide the updated image.

6. The method of claim 1, wherein receiving the updated image comprises:
receiving a second image from a participant; and
determining whether a geographical location in the second image corresponds to the geographical location of the first image.

7. The method of claim 6, wherein determining whether the geographical location in the second image corresponds to the geographical location of the first image is based at least in part on metadata associated with the second image.

8. The method of claim 6, wherein determining whether the geographical location in the second image corresponds to the geographical location of the first image is based on additional information provided by the participant.

9. The method of claim 1, wherein the status indicates that the first image is out of date.

10. A system comprising:
a memory storing map data including at least a first image of a geographical location corresponding to the map data;
one or more computing devices in communication with the memory, the one or more computing devices:
receiving a request for the map data;
providing the first image in response to the request;
receiving information from a first user relating to a status of an object in the first image, the information including one or more annotations added to an image layer associated with the first image;
determining whether the first image is to be updated based at least on the received information from the first user, wherein the determining includes at least one of:
(i) determining whether a predetermined number of objects in the first image are indicated to be inaccurate or out of date;
(ii) determining whether a predetermined number of submissions relating to an object in the first image were received;
(iii) determining whether the status information indicates that an object in the first image has changed;
(iv) determining a date when the first image was taken; or
(v) determining a quality measure of the first image comprising: resolution, blurriness, or lighting.

11. The system of claim 10, wherein the one or more processors further sends a notification to a second user associated with the object of the received status information.

12. The system of claim 11, wherein the one or more processors further requests the second user associated with the object to provide the updated image.

13. The system of claim 10, wherein it is determined that the first image is to be updated if status information is received for a predetermined number of objects within a given area of the geographical location.

14. The system of claim 10, wherein receiving the updated image comprises:
receiving a second image from a participant; and
determining whether a geographical location in the second image corresponds to the geographical location of the first image.

15. The system of claim 14, wherein determining whether the geographical location in the second image corresponds to the geographical location of the first image is based on additional information provided by the participant.

16. The system of claim 10, wherein the status indicates that the first image is out of date.

17. A non-transitory computer readable medium storing instructions executable by a processor for performing a method comprising:
receiving a request for map data; providing, in response to the request, a first image of a geographical location corresponding to the map data;
receiving information from a first user relating to a status of an object in the first image, the information including one or more annotations added to an image layer associated with the first image;
determining whether the first image is to be updated based at least on the received information from the first user, wherein the determining includes at least one of:
(i) determining whether a predetermined number of objects in the first image are indicated to be inaccurate or out of date;
(ii) determining whether a predetermined number of submissions relating to an object in the first image were received;
(iii) determining whether the status information indicates that an object in the first image has changed;
(iv) determining a date when the first image was taken; or
(v) determining a quality measure of the first image comprising: resolution, blurriness, or lighting.

18. The non-transitory computer readable medium of claim 17, the method further comprising sending a notification in response to receiving the status information.

19. The non-transitory computer readable medium of claim 17, wherein it is determined that the first image is to be updated if status information is received for a predetermined number of objects within a given area of the geographical location.

* * * * *